(12) United States Patent
Qiang et al.

(10) Patent No.: US 9,749,838 B2
(45) Date of Patent: Aug. 29, 2017

(54) PMIP PROTOCOL ENHANCEMENT

(75) Inventors: Zu Qiang, Kirkland, CA (US); Yong Yang, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1016 days.

(21) Appl. No.: 13/508,544

(22) PCT Filed: Apr. 26, 2012

(86) PCT No.: PCT/EP2012/057626
§ 371 (c)(1),
(2), (4) Date: May 8, 2012

(87) PCT Pub. No.: WO2013/023798
PCT Pub. Date: Feb. 21, 2013

(65) Prior Publication Data
US 2013/0044682 A1    Feb. 21, 2013

Related U.S. Application Data

(60) Provisional application No. 61/524,552, filed on Aug. 17, 2011.

(51) Int. Cl.
*H04W 4/00* (2009.01)
*H04W 8/08* (2009.01)

(52) U.S. Cl.
CPC .................. *H04W 8/085* (2013.01)

(58) Field of Classification Search
CPC ........... H04L 63/0892; H04L 29/12066; H04L 2212/0025; H04L 29/12216; H04L 63/00; H04L 65/1016; H04L 65/105; H04L 69/14
(Continued)

(56) References Cited

U.S. PATENT DOCUMENTS 7,447,188 B1    11/2008   Dommety et al.
8,761,007 B1 *   6/2014   Damle et al. ................ 370/229
(Continued)

FOREIGN PATENT DOCUMENTS

CN    101897217 A    11/2010
CN    101925055 A    12/2010
(Continued)

OTHER PUBLICATIONS

3GPP TS 29.275, Release 9, Technical Specification Group Core and terminals; Proxy mobile IPv6(PMIPv6) based mobility and tunnelling, Mar. 2010, pp. 1-75.*
(Continued)

*Primary Examiner* — Andrew Chriss
*Assistant Examiner* — Romani Ohri
(74) *Attorney, Agent, or Firm* — Rothwell, Figg, Ernst & Manbeck, p.c.

(57) ABSTRACT

Example embodiments presented herein are directed towards determining a Proxy Mobile Internet Protocol version 6 (PIMPv6) control plane used by a network node peer in an Internet Protocol version 4 (IPv4) transport network. The example embodiments provide a mechanism in PMIP protocol stack, to allow a Mobility Access Gateway/Local Mobility Anchor (MAG/LMA) node such as SGW (which may be supporting both PMIP draft and PMIP RFC) to decide which PMIP protocol stack shall be used to communicate to the peer node, i.e. LMA/MAG.

31 Claims, 5 Drawing Sheets

(58) Field of Classification Search
USPC .......................................... 370/328–331, 259
See application file for complete search history.

(56) References Cited

U.S. PATENT DOCUMENTS

| | | | |
|---|---|---|---|
| 2009/0122750 A1* | 5/2009 | Sarikaya ........................ | 370/328 |
| 2009/0323557 A1* | 12/2009 | Tremaine et al. ............. | 370/255 |
| 2011/0222543 A1* | 9/2011 | Jiang ............................. | 370/392 |
| 2012/0076073 A1* | 3/2012 | Merlin et al. .................. | 370/328 |
| 2012/0179803 A1* | 7/2012 | Melia et al. ................... | 709/223 |

FOREIGN PATENT DOCUMENTS

| | | |
|---|---|---|
| CN | 101977246 A | 2/2011 |
| EP | 2247079 A1 | 11/2010 |
| JP | 2012-227664 A | 11/2012 |
| WO | 2007/023966 A1 | 3/2007 |

OTHER PUBLICATIONS

Wakikawa R et al.: "IPv4 Support for Proxy Mobile IPv6; RFC 5844", Internet Engineering Task Force (IETF), May 20 (May 2010), XP015070812, ISSN: 2070-1721.*

Wakikawa R et al.: "IPv4 Support for Proxy Mobile IPv6; RFC 5844", Internet Engineering Task Force (IETF), May 20 (May 2010), XP015070812, ISSN: 2070-1721 [retrieved on May 24, 2010] cited in the application, section 4, figure 10.

Devarapalli V et al. "Heartbeat Mechanism for Proxy Mobile IPv6; RFC 5847", Internet Engineering Task Force (IETF), Jun. 2010 (Jun. 2010), pp. 1-11, XP015070837, ISSN: 2070-1721 [retrieved on Jun. 11, 2010] the whole document.

International Search Report and Written Opinion issued in corresponding International Patent Application No. PCT/EP2012/057626, issued by the European Patent Office with mailing date Aug. 6, 2012.

Office Action issued on Feb. 2, 2016 in corresponding Japanese Patent Application No. 2014-525354, 5 pages.

Office Action issued on Jul. 11, 2016 in corresponding Russian Patent Application No. 2016122064/20, 3 pages.

Communication pursuant to Article 94(3) EPC issued for European patent application No. 12 718 180.8 dated Nov. 28, 2016, 4 pages.

First Office Action dated Mar. 3, 2017 in corresponding Chinese Application No. 201280051162.7, 12 pages.

Search Report dated Feb. 23, 2017 in corresponding Chinese Application No, 201280051152.7, 2 pages.

* cited by examiner

US 9,749,838 B2

PMIP PROTOCOL ENHANCEMENT

RELATED APPLICATIONS

This application claims the benefit of U.S. Provisional Application No. 61/524,522, filed on Aug. 17, 2011. This application is also a National Stage application under 35 U.S.C. 371 of International Application No. PCT/EP2012/057626, filed on Apr. 26, 2012.

TECHNICAL FIELD

The example embodiments are directed towards improving PMIP protocol usage. Specifically, some of the example embodiments are directed towards providing a network node the decision of which PMIP protocol shall be used in network communications.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

Proxy Mobile Internet Protocol version 6 (PMIPv6) is a network-based mobility management protocol standardized by IETF. PMIPv6 is a protocol for building a common and access technology independent of mobile core networks, accommodating various access technologies such as WiMAX, 3GPP, 3GPP2 and WLAN based access architectures.

SUMMARY

At least one example object of the example embodiments presented herein is to improve PMIPv6 communications. The concept of the example embodiments presented herein is to provide a mechanism in PMIP protocol stack, to allow a MAG node such as SGW (which may be supporting both PMIP draft and PMIP RFC) or a LMA to decide which PMIP protocol stack shall be used to communicate to the peer node, i.e. LMA/MAG. Some of the example embodiments presented herein may be directed towards solving backward incompatibility issues between the PMIP RFC and the PMIP Draft.

The example embodiments may comprise a mechanism for a supporting dual PMIP protocol (PMIP RFC or PMIP draft) stack node, e.g. MAG/LMA, when the transportation network is IPv4 network and it initiates communication towards a peer node, e.g. sending Proxy Binding Update message. The mechanism may comprise sending the message in two formats in the very first communication with the peer node or it doesn't know which PMIP protocol the peer node supports, one is in light of PMIP draft, i.e. PMIPv6 message/IPv6/with IPv4 or IPv4-UDP encapsulation and the other is in line with PMIP RFC, i.e. PMIPv6/UDP/IPv4. Therefore, if the peer node supports one PMIP protocol stack, it will only be able to answer one of the messages; and if the peer node supports both PMIP protocol stacks, the node may respond solely to the RFC version messages. By above mechanism, either the PMIP draft or PMIP RFC protocol stack may be selected for the rest communication.

Accordingly, some of the example embodiments may be directed towards a method in a first network peer node for determining a PMIPv6 control plane used by a second network peer node. The first and second network peer nodes are in an Internet Protocol version 4 (IPv4) transport network. The method comprises sending, to the second network peer node, at least one communication message in at least one control plane format. The method further comprises receiving at least one communication response with respect to the at least one communication message. The method also comprises determining a version of the PMIPv6 control plane which is utilized by the second network peer node based on the at least one communication response.

Some of the example embodiments may be directed towards a first network peer node for determining a PMIPv6 control plane used by a second network peer node. The first and second network peer nodes are in an IPv4 transport network. The first network peer node comprises transmitting circuitry configured to send, to the second network peer node, at least one communication message in at least one control plane format. The first network peer node further comprises receiving circuitry configured to receive at least one communication response with respect to the at least one communication message. The first network peer node also comprises processing circuitry configured to determine a version of the PMIPv6 control plane which is utilized by the second network peer node based on the at least one communication response.

BRIEF DESCRIPTION OF THE DRAWINGS

The foregoing will be apparent from the following more particular description of the example embodiments, as illus

DEFINITIONS

Figure 1:
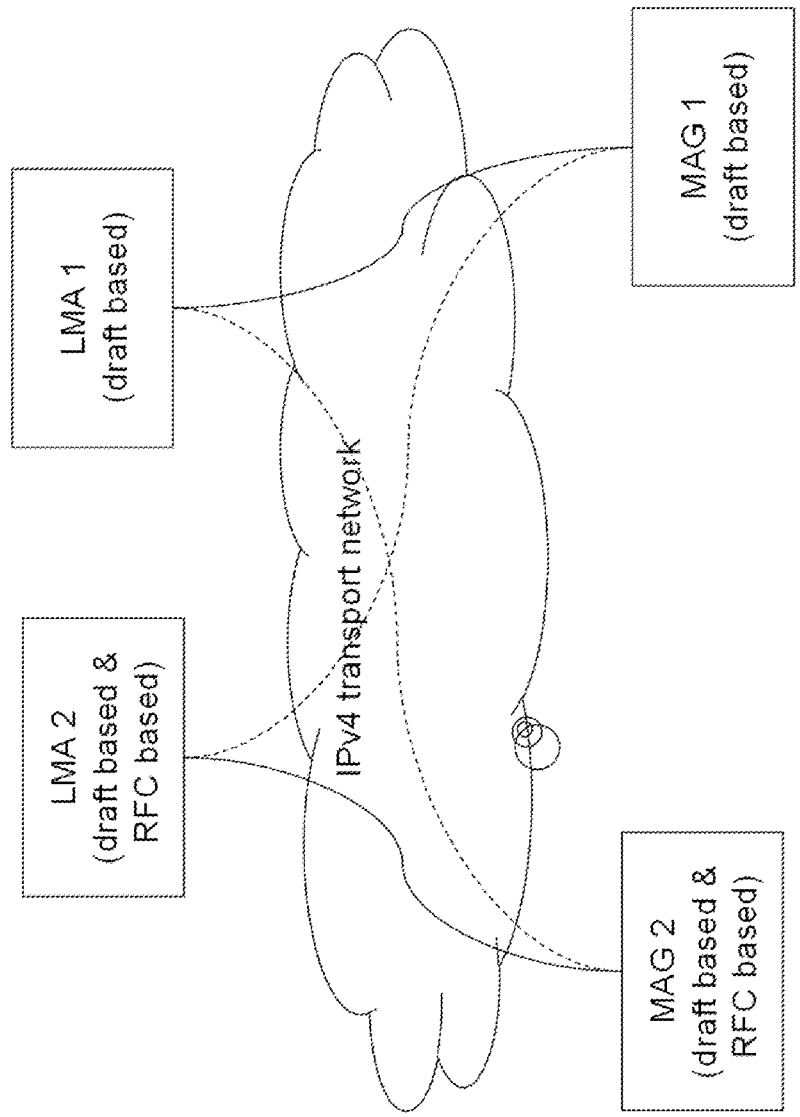
- FIGS. 1-3 are illustrative examples of migration paths.

3GPP Third Generation Partnership Project
3GPP2 Third Generation Partnership Project 2
BNG Broadband Network Gateway
BSC Base Station Controller
DNS Domain Name System
EPC Evolved Packet Core
ePDG Evolved Packet Data Gateway
GPRS General Packet Radio Service
GSM Global System for Mobile Communications
GTP GPRS Tunneling Protocol
GW Gateway
HRPD High Rate Packet Data
HS GW HRPD Serving Gateway
IE Information Element
IETF Internet Engineering Task Force
IPv4 Internet Protocol version 4
IPv6 Internet Protocol version 6
LMA Local Mobility Anchor
LTE Long Term Evolution
MAG Mobile Access Gateway
MME Mobility Management Entity
PDN Packet Data Network
PGW PDN Gateway
PLMN Public Land Mobile Network
PMIP Proxy Mobile Internet Protocol
PMIPv6 Proxy Mobile Internet Protocol version 6
RAN Radio Access Network
RBS Radio Base Station
RNC Radio Network Controller
S4-SGSN S4 Serving GPRS Support Node
SGW Serving Gateway
UE User Equipment
UDP User Datagram Protocol
UMTS Universal Mobile Telecommunications System
UTRAN UMTS Terrestrial Radio Access Network
WCDMA Wideband Code Division Multiple Access
WiMAX Worldwide Interoperability for Microwave Access
WLAN Wireless Local Area Network

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

As a means of explaining the example embodiments presented herein, a problem will first be identified and discussed. 3GPP CT4 has agreed to update the PMIP C-plane protocol stack of TS29.275 to align RFC as for Rel-9/onward. Although the reference to the IETF document of Rel-9 has already been updated to RFC5844 from the IETF Draft, "IPv4 Support for Proxy Mobile IPv6", draft-ietf-netlmm-pmip6-ipv4-support-17. However, the change for the C-Plane protocol stack has not been reflected.

At the same time CT4 realized that the RFC was not backward compatible to the draft when using PMIPv6 over an IPv4 transport network. With the draft version, NAT-traversal was recommended where the UDP encapsulation is optional depending on if an on-path NAT has been detected or not. With the PMIP RFC, UDP encapsulation becomes mandatory and the inner IPv6 header is removed. Thus, a draft version PMIP node cannot communicate with a RFC version PMIP node. Furthermore, a draft version based PMIP operator cannot keep the draft version PMIP node forever as the draft version PMIP protocol stack is not supported by IETF anymore. However, the interworking issue also gives a problem for a draft version based PMIP network migrating to a RFC based PMIP network. Thus, some mechanisms or backward compatible way to update the specification from Rel-8 to Rel-9/onward was required.

A DNS based solution comprised in the 3GPP CT4 contribution C4-111205 was proposed by NTTDOCOMO, to enhance DNS procedures for GW selection, where new Service Parameters "x-3GPP-sgw:x-s5-pmip2", "x-3GPP-sgw:x-s8-pmip2", "x-3GPP-pgw:x-s5-pmip2" were introduced to indicate the RFC style PMIP Control Plane A capability while following existing "Service Parameters" "x-3GPP-sgw:x-s8-pmip", "x-3GPP-sgw:x-s5-pmip", "x-3GPP-pgw:x-s5-pmip" which are reflecting draft style PMIP Control Plane capability. By introducing the above new Service Parameter, the MME/S4-SGSN is able to select SGW/PGW with the same style of the PMIP protocol stack.

Below various methods for improving PMIP communications will be discussed.

Migration Path—Non-Roaming Case

Migration paths to upgrade those PMIP draft based nodes, e.g. SGW/PGW/ePDG, to PMIP RFC based will now be discussed.

Alternative 1: Upgrade all PMIP nodes to RFC based PMIP protocol stack within one night Software upgrade on all PMIP nodes from draft based to RFC based within a very short time. With limited system downtime, the network can be migrated into the new PMIP protocol stack at the same time.

Pros:
No impact on non-PMIP nodes
Quick migration path (One step migration)
Cons:
Limited system downtime
All nodes have to be upgraded together
Conclusion: No extra migration solution is needed.
Alternative 2: Two Step Migration
With this alternative, the operator can keep the draft based PMIP nodes for a longer time. When adding new PMIP nodes into the network, the new PMIP nodes (LMA and/or MAG) must be capable to support both RFC based and draft based PMIP protocol stack simultaneously.

As shown in FIG. 1, LMA 1 and MAG 1 are draft based PMIP nodes. Step 1 of the migration path is to add LMA 2 and MAG 2 which is dual stack supported. Both MAGs can communicate with the two LMAs without any problem.

With this alternative, the added new PMIP nodes can be part of the existing PMIP network for the purpose of serving different PDN, or load sharing, or system redundancy, etc. There is also no mobility issue between MAG1 and MAG2 coverage.

However, to avoid communication problems at the very first time, an indicator may be needed at the new MAG before sending the very first PMIP message to a specific LMA. This indicator may also need to be forwarded to the target system at mobility procedure. In this step the indicator shall inform the MAG2 that either a draft protocol stack shall be applied or any protocol stack shall be applied.

Figure 2:
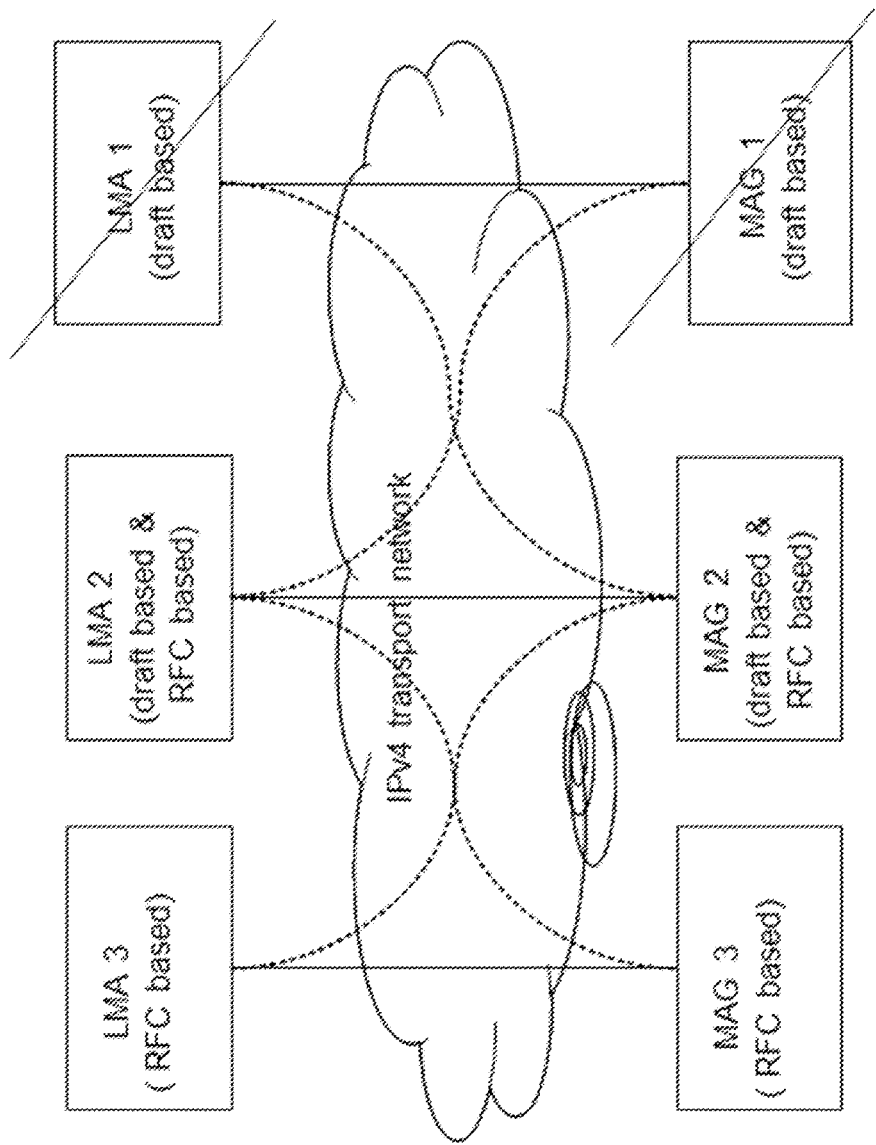

Step 2 of the migration path, illustrated in FIG. 2, is to add LMA3 and MAG3 which is RFC stack supported when the draft based PMIP nodes has been removed (or upgraded) completely. This is to avoid the interworking and mobility problem between LMA1/MAG1 and LMA3/MAG3.

Similar to step 1, to avoid communication problems at the very first time, an indicator may be needed at the MAGs before sending the very first PMIP message to a specific LMA. This indicator may also need to be forwarded to the target system at mobility procedure. In this step the indicator shall inform the MAG2 either RFC protocol stack shall be applied or any protocol stack shall be applied.

Pros:
All the new PMIP nodes and old PMIP nodes can communicate to each without another problem.
The PMIP node upgrade can be taken one by one
No system downtime
Cons:
Longer migration path
Two steps migration
In step 1, new developed PMIP node has to support both draft based and RFC based protocol stack simultaneously.
Alternative 3: Adding new PMIP nodes (LMA and/or MAG) which is RFC stack supported only With this alternative, the operator can keep the draft based PMIP nodes for a longer time. When adding new PMIP nodes into the network, the new PMIP nodes (LMA and/or MAG) can be capable of supporting the RFC based PMIP protocol stack only.

Figure 3:
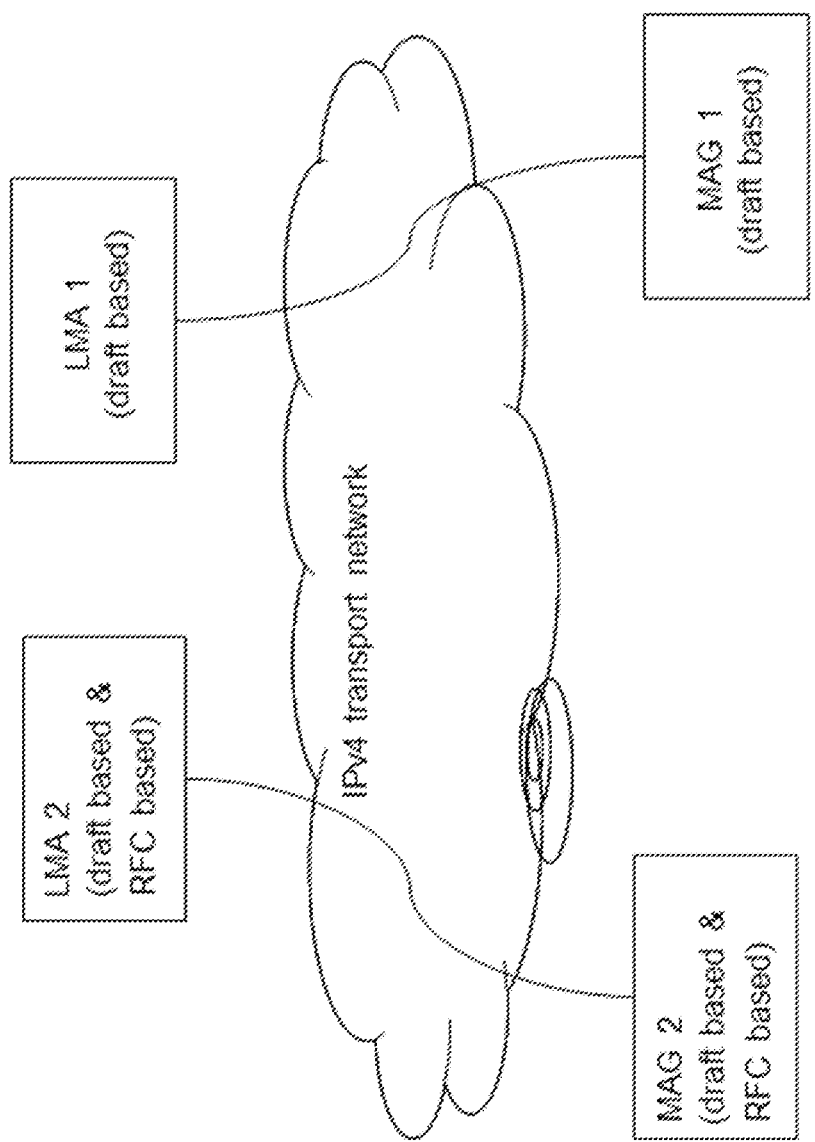

As shown in FIG. 3, LMA 1 and MAG 1 are draft based PMIP nodes. LMA 2 and MAG 2 are the new PMIP node which is RFC based only. There is no communication between LMA1 and MAG2 or between LMA2 and MAG1 due the incompatible issue of the supported PMIP protocol stack.

With this alternative, the added new PMIP nodes become a separated PMIP network from the existing PMIP network. There is no interworking and mobility between the two networks until the PMIP draft based nodes upgrade to either support both RFC and draft or support RFC only. An extra indicator has to be added at the GW selection procedure. This indicator may also need to be forwarded to the target system at mobility procedure.

The indicator shall be based per user equipment.
Pros:
No system downtime
One step migration
New PMIP node is not required to support PMIP draft which is ultimately shall be removed from 3GPP.
Cons:
Two separated network to maintain.
No load sharing, interworking and mobility between the two networks.

Analysis

Alternative 1 is an easy and quick solution. It also does not require any standardization work. Alternative 3 is unlikely to happen due to the interworking and mobility issues and the maintenance work of two networks at same time.

Alternative 2 is very possible as it provides a smooth migration path. If it can be assumed that alternative 2 is the possible migration path, this new indicator can be implemented in a few different ways:

Solution 1: Local configuration in MAG2
In migration step 1, the MAG2 shall be configured with draft version enabled.
In migration step 2, the MAG2 shall be re-configured with RFC version enabled.
Pros
No standardization impact
No impacts on any non-PMIP nodes
Low cost
Cons
Network management cost for re-configuration in SGW Solution 2: A new GTP indicator sent by MME
Before migration step 1, all MMEs in the network have to be upgraded in order to support the new GTP indicator.
In migration step 1, the MME sends the new "draft version shall be used" indicator with to MAG2 at Create Session Request message.
In migration step 2, the MME sends the new "RFC version shall be used" indicator with to MAG2 at Create Session Request message.
Pros
No re-configuration in MAGs
Cons
Standardization impacts on GTP
All MMEs must be upgraded first before the migration started.
Network management cost for re-configuration in MME
Extra cost Solution 3: A new GTP indicator sent by MME, plus a new DNS name paring function
Before migration step 1, all MMEs in the network have to be upgraded in order to support the new GTP indicator.
In migration step 1, only "draft version PMIP" shall be selected at MME DNS paring procedure. And the MME sends the new "draft version shall be used" indicator with to MAG2 at Create Session Request message.
Before migration step 2, new DNS configuration for the new PMIP DNS name.
In migration step 2, only "RFC version PMIP" shall be selected at the MME DNS paring procedure. And the MME sends the new "RFC version shall be used" indicator with to MAG2 at Create Session Request message.
Pros
No re-configuration in MAGs.
Cons
Standardization impacts on GTP.
All MMEs must be upgraded first before the migration started.
New MME DNS paring procedure which may not be backward compatible.
Network management cost for re-configuration in MME and DNS.
Extra cost.

Solution 4: Same as solution 3, but with two new DNS names in a migration network.
  With this solution, the current DNS name is unchanged in the standards. Two new PMIP DNS names are added for S5 interface: s5-pmip-rfc and s5-pmip-draft.
  The two new PMIP DNS names are only used within the migration network. This can avoid any impacts on existing R8/R9/R10 MME implementations.

Introduction to the Example Embodiments

Alternative 2 is very possible as it provides a smooth migration path. However, a migration solution may be needed. This is because the MAG 2 needs to know which PMIP version shall be applied before sending a PMIP message to a LMA. It could use a DNS based solution, where new Service Parameters are introduced to allow the MME to select a set of SGW/PGW nodes which are supporting the same PMIP protocol stack, however in order to support roaming and inter-SGW mobility procedures, inter 3GPP and non-3GPP procedures, the complete DNS solution needs to update many protocols, e.g. DNS/GTP/Diameter protocol, and this has an impact on many interfaces S11/S4/S3/S10/S1 S6a/S6d/SWx. More importantly is the fact that in order to support PMIP based roaming, the MME (even if it is located in a serving network where only one PMIP RFC is deployed but having a roaming agreement with problematic Home PLMN where both PMIP stacks are deployed) has to support new PMIP naming and has to support a new PMIP protocol stack IE in GTPv2, this is not appropriate. On the other hand, supporting dual stacks as an intermediate step during migration cannot be avoided, therefore another beneficial solution, which is purely enhancement on PMIP protocol stack, could be utilized.

Example Updates on MAG Related Procedures

Some of the example embodiments may comprise updates to MAG related procedures. When a MAG node supports both PMIP protocol stacks as specified above and the IPv4 is used in transportation network, at the first communication with the peer node, or if the MAG node doesn't know which PMIP protocol the peer node supports, the MAG node may send the PMIP message, e.g. Proxy Binding Update, to the LMA with two formats using different PMIP protocol stacks if the MAG doesn't know which PMIP protocol stack is supported by the peer LMA node. If the response message is received in two formats, only the RFC based may be taken into consideration.

Example Updates on LMA Related Procedures

Some of the example embodiments may comprise updates to LMA related procedures. When a LMA node supports both PMIP protocol stacks as specified above and the IPv4 is used in transportation network, and it receives the PMIP message in two formats from the same MAG, the LMA node may only send the response message in RFC format.

Example Updates on Heartbeat Mechanisms

Some of the example embodiments may comprise updates on heartbeat mechanisms. Heartbeat mechanisms may also be used to inform peer node which PMIP protocol stack should be used.

When a MAG or LMA node supports both PMIP protocol stacks as specified above and the IPv4 is used in transportation network, at the first communication with the peer node (or the MAG or LMA node does not know which PMIP protocol the peer node supports) the MAG or LMA node may send a Heartbeat Request message in two formats in corresponding to PMIP draft and PMIP RFC.

When a MAG or LMA node supports both PMIP protocol stacks as specified above and the IPv4 is used in transportation network, if the Heartbeat Request message is received from the same peer node in two formats in corresponding to PMIP draft and PMIP RFC, the peer node may only response Heartbeat Response in the RFC format. If the response message is received in two formats, only the RFC based may be taken into consideration.

Example Upgrade Mechanisms

Some example embodiments may be directed towards an upgrade mechanism in a PMIP tunnel management procedure. When a MAG or LMA node supports both PMIP protocol stacks as specified above and the IPv4 is used in transportation network, in case of software upgrades, e.g. upgrade to the RFC based PMIP version, the MAG or LMA node may increase the Restart Counter which will trigger the Heartbeat mechanism to inform the peer node what PMIP version it is supporting.

Example Node Configuration

Figure 4:
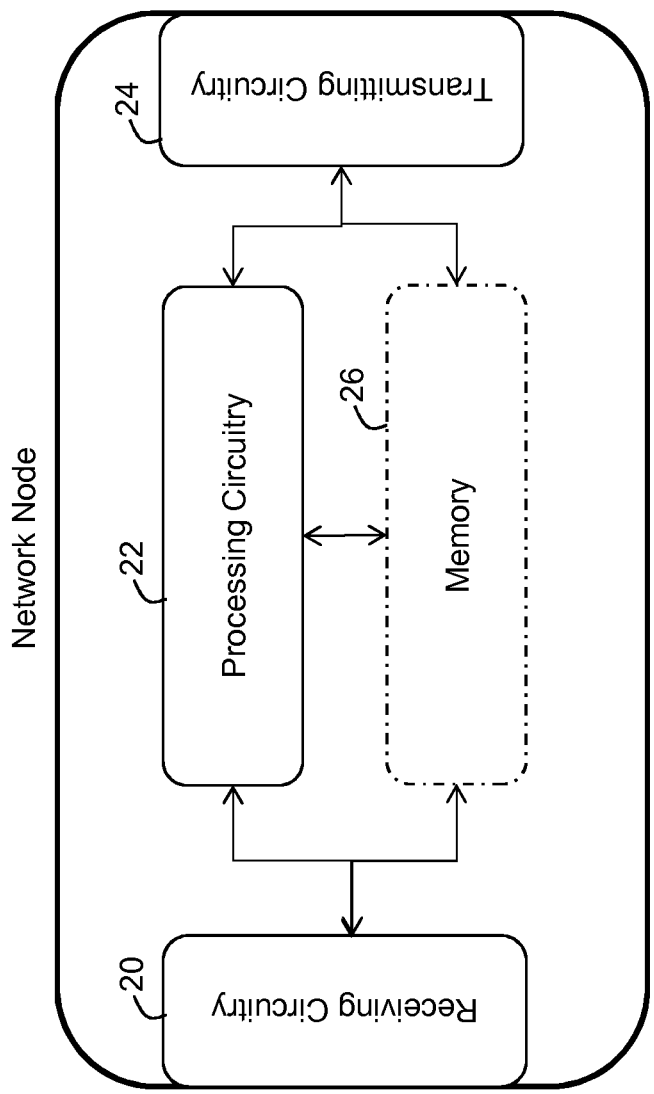
FIG. 4 is a schematic of a network node, according to some of the example embodiments.

FIG. 4 illustrates an example of a network node (e.g., a MAG, LMA, and/or peer node) which may incorporate some of the example embodiments discussed herein. The network node 14 may comprise any number of communication ports or circuitry, for example receiving circuitry 20 and transmitting circuitry 24. The communication ports or circuitry may be configured to receive and transmit any form of communications data or instructions. It should be appreciated that the network node 14 may alternatively comprise a single transceiver port or circuitry. It should further be appreciated that the communication or transceiver port or circuitry may be in the form of any input/output communications port or circuitry known in the art.

The network node 14 may further comprise at least one memory unit 26. The memory unit 26 may be configured to store received, transmitted, and/or measured data of any kind and/or executable program instructions. The memory unit 26 may be any suitable type of computer readable memory and may be of a volatile and/or non-volatile type.

The network node 14 may also comprise processing circuitry 22 that may be configured to establish a plurality of optical routes based on information received in a SSL 11. It should be appreciated that the processing circuitry 22 may be any suitable type of computation unit, e.g. a microprocessor, digital signal processor (DSP), field programmable gate array (FPGA), or application specific integrated circuit (ASIC). It should also be appreciated that the processing circuitry 22 need not be comprised as a single unit. The processing circuitry 22 may be comprised as any number of units or circuitry.

Example Network Node Operations

Figure 5:
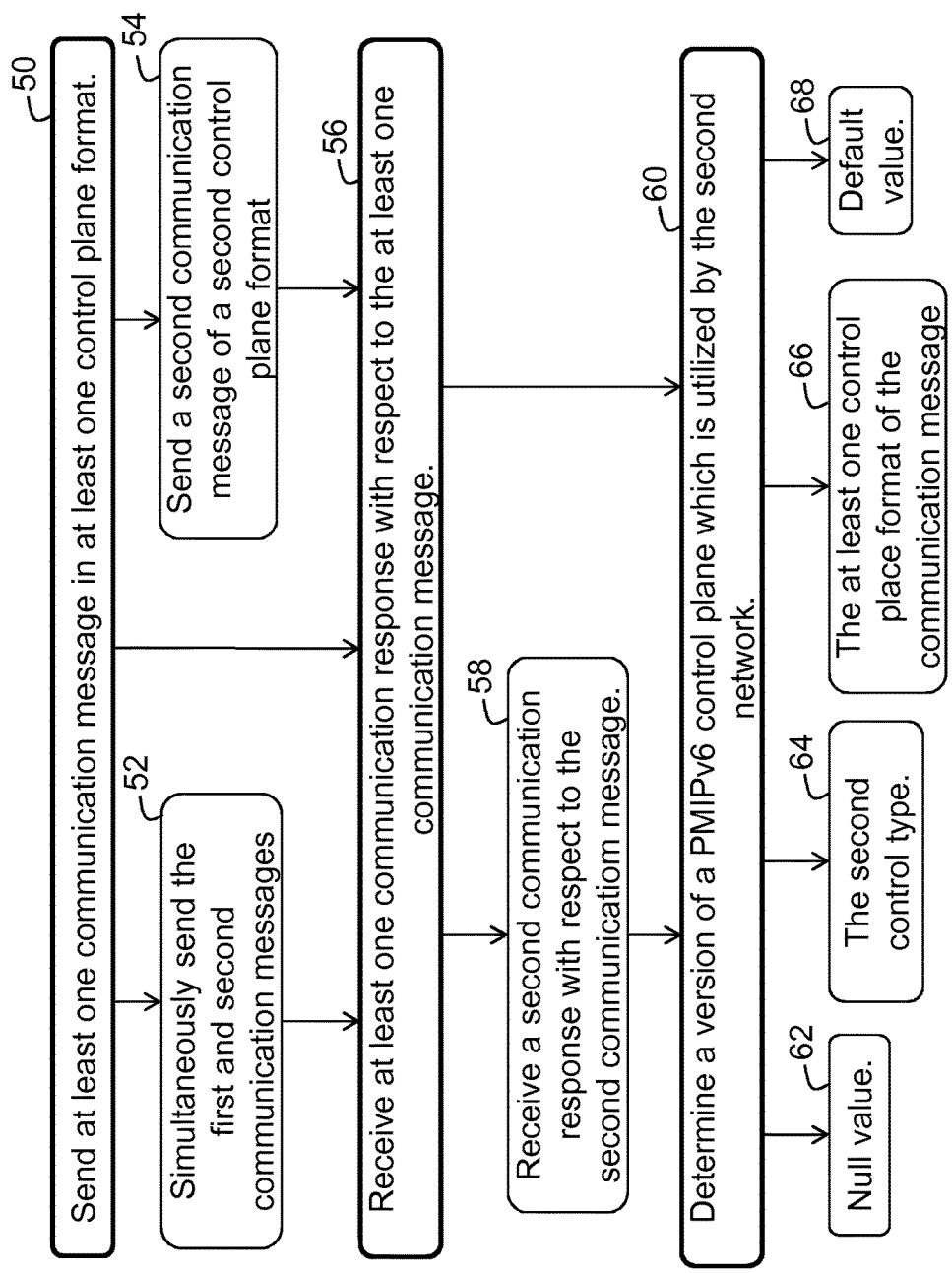
FIG. 5 is a flow diagram depicting example operations of the network node of FIG. 4.

FIG. 5 is a flow diagram depicting example operations of a first network peer node, such as the network node of FIG. 4. The example flow of operations is directed towards a method in the first network peer node for determining a PMIPv6 control plane used by a second network peer node. The first and second network peer nodes are in an IPv4 transport network. The first and second network peer nodes may be MAG/LMA nodes such as the MAG/LMA nodes described in FIGS. 1-3. It should be appreciated that according to some of the example embodiments, the LMA node may be a PGW. According to some of the example embodiments, the MAG node may be a SGW, a Evolved Packet Data Gateway (ePDG), a HRPD Serving Gateway (HS GW), and/or a Broadband Network Gateway (BNG).

Operation 50

The first network peer node sends 50, to the second network peer node, at least one communication message in at least one control plane format. The transmitting circuitry 24 is configured to send, to the second network peer node, the at least one communication message in the at least one control plane format. It should be appreciated that the control plane format may be a control plane A or a control plane B format.

According to some of the example embodiments, the first network peer node is a MAG node and the second network peer node is a LMA node. In such example embodiments, the at least one communication may be a Heartbeat message or a proxy binding update request.

According to some of the example embodiments, the first network peer node is a LMA node and the second network peer node is a MAG node. In such example embodiments, the at least one communication is a Heartbeat message.

Example Operation 52

According to some of the example embodiments, the at least one communication message may be a first and a second communication message of a first and a second control type (e.g., control plane format A and control plane format C), respectively. The sending 50 may further comprise simultaneously sending 52 the first and second communication messages to the second network peer node. The transmitting circuitry 24 may be configured to simultaneously send the first and second communication messages.

Example Operation 54

According to some of the example embodiments, the at least one communication message may be a first communication message of a first control type. If a response from the second network peer node is not received within a period of time, the at least one communication response is a first communication response. The first communication response is a first internal notification that a second communication message of a second control plane type needs to be sent. For example, not receiving a response from the second network peer node may be the result of the second network peer node not supporting the first control type in which the first communication message was sent. The receipt of the first internal notification may be based on user programmable rules within the first network peer node. It should be appreciated that the above scenario may be used to describe example operations 54, 58, 62 and 64.

Thus, according to some of the example embodiments, the first network peer node may send 54 the second communication message of the second control plane type. The transmitting circuitry 24 may send the second communication message of the second control type.

Operation 56

The first network peer node is further configured to receive 56 at least one communication response (e.g., the first communication response and/or the second communication response) with respect to the at least one communication message (e.g., the first communication message and/or the second communication message), respectively. The receiving circuitry 20 is configured to receive the at least one communication response with respect to the at least one communication message.

Example Operation 58

In the example embodiments where multiple communication messages have been sent (e.g., example operation 52) or where a second communication message has been sent after a predetermined period of time (e.g., example operation 54), the first network peer node may receive 58 a second communication response with respect to the second communication message. The receiving circuitry may be configured to receive the second communication response with respect to the second communication message.

Operation 60

The first network peer node further determines 60 a version of the PMIPv6 control plane which is utilized by the second network peer node based on the at least one communication response. The processing circuitry 22 is configured to determine the version of the PMIPv6 control plane which is utilized by the second network peer node based on the at least one communication response.

Example Operation 62

According to some of the example embodiments, if a response from the second network peer node is not received within the predetermined period of time, the second communication response is a second internal notification that indicates communication with the second network node is not possible. Thus, the determining 60 may further comprise determining 62 the PIMPv6 control plane to be a null value. The processing circuitry 22 may be configured to determine the PIMPv6 control plane to be a null value.

This may mean that the second network peer node is not currently available. Thus, according to some of the example embodiments, the first network peer node may attempt a re-transmission of the second and/or first communication message in order to avoid a transient path failure.

Example Operation 64

According to some of the example embodiments, if the second communication response is received from the second network peer node, the determining 60 may further comprise determining 64 the PIMPv6 control plane value to be the second control type (e.g., the control type of the second communication message). The processing circuitry 22 is configured to determine the PIMPv6 control plane value to be the second control type.

Example Operation 66

According to some of the example embodiments, if the at least one communication response is received from the second network peer node, the determining 60 may further comprise determining 66 the PIMPv6 control plane value to be the at least one control plane format of (or associated with) the at least one communication message. The processing circuitry 22 may be configured to determine the PIMPv6 control plane value to be the at least one control plane format of the at least one communication message.

According to some of the example embodiments, the at least one control plane value may be control plane A. For example, according to some of the example embodiments, perhaps only one communication message may be sent at a time in order to save system resources. Thus, the sending may be performed in a hierarchal manner. According to some example embodiments, communication messages of control plane type A may be sent first. If a communication response is not received, the first network peer node may thereafter send a communication message of control plane type B.

Example Operation 68

According to some of the example embodiments, if a plurality of communication responses are received from the second network peer node (e.g., after a plurality or two communication messages are transmitted), the determining 60 may further comprise determining 68 the PIMPv6 control plane value to be a default control plane format. According to some of the example embodiments, the default control plane format value may be control plane A. The processing circuitry 22 may be configured to determine the PIMPv6 control plane value to be the default control plane format.

CONCLUSION

Thus, the example embodiments solve the various problems described herein. Non-limiting examples of problems, issues, considerations, or benefits associated with the example embodiments may be:

a. Ultimately, the 3GPP PMIP protocol shall be in line with IETF RFC, thus any PMIP draft based 3GPP nodes shall be upgraded to support PMIP RFC.

b. The example embodiments should be able to minimize any possible system downtime.

c. The example embodiments should minimize the impact to other network elements, e.g. MME/HSS, which are based on complete different protocol stacks.

d. The example embodiments shall not affect other operator's networks where there is no PMIP based node deployed or only PMIP RFC nodes deployed.

e. The example embodiments further solve the PMIP backward incompatible issue without any impact on other network elements and/or protocol stacks.

Some of the example embodiments may comprise a method in a network node for PMIP protocol enhancement, wherein the network node may be in an IPv4 network. The method may comprise the steps of initiating a communication towards a peer node; and transmitting, to the peer node, a PMIP message in two formats. The example embodiments described above may further comprise transmitting the PMIP message in a PMIP draft and PMIP RFC format.

Any of the example embodiments described above may further comprise the peer node receiving the PMIP message in two formats. If the peer node is only able to support one of the two transmitted formats, the peer node may respond in the supported format. If the peer node is able to support both of the transmitted formats, the peer node may respond in the PMIP RFC format.

Any of the example embodiments described above may further comprise initiating the communication in the form of a Heartbeat request.

Any of the example embodiments described above may further comprise initiating the communication in the form of a Proxy Binding Update message.

Any of the example embodiments described above may further comprise increasing a Restart Counter during a software upgrade, and thereby triggering a Heartbeat mechanism to inform the peer node what PMIP version the peer node is supporting.

Some of the example embodiments may also comprise a network node for PMIP enhancement. The network node may comprise a generating unit for generating messages in an initiation of a communication towards a peer node; and a transmitting unit to transmit, to the peer node, said messages featuring a PMIP message in two formats.

The example embodiment may further comprise the network node being configured to perform any one of the example embodiments described above.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method in a first network peer node for determining a Proxy Mobile Internet Protocol version 6 (PMIPv6) control plane used by a second network peer node, the first and second network peer nodes being in an Internet Protocol version 4 (IPv4) transport network, the method comprising:
sending, to the second network peer node, a first communication message in a first control plane format, said first control plane format being one of: a control plane format according to Request For Comment (RFC) 5844 (RFC Control Plane Format) and a control plane format according to a draft of RFC 5844 (Draft RFC Control Plane Format);
obtaining first information with respect to the first communication message, the first information indicating one of: 1) that the second network peer responded to the first communication message by transmitting a responsive communication message in said first control plane format and 2) that the second network node did not respond to the first communication message by transmitting a responsive communication message in said first control plane format; and determining, using said obtained first information, whether the second network peer node is: a) utilizing a first version of the PMIPv6 control plane or a second version of the PMIPv6 control plane or b) not utilizing either the first version or the second version of the PMIPv6 control plane, wherein the first version of the PMIPv6 control plane is a version corresponding to RFC 5844 and the second version of the PMIPv6 control plane is a version corresponding to a draft of RFC 5844.

2. The method of claim 1, wherein
the first network peer node is a Mobile Access Gateway (MAG) node,
the second network peer node is a Local Mobility Anchor (LMA) node, and
the communication message is a Heartbeat message or a proxy binding update request.

3. The method of claim 1, wherein
the first network peer node is a Local Mobility Anchor (LMA) node,
the second network peer node is a Mobile Access Gateway (MAG) node, and
the communication message is a Heartbeat message.

4. The method of claim 1, wherein
the obtained first information indicates that the second network node did not respond to the first communication message by transmitting a responsive communication message in said first control plane format, and
the method further comprises sending, to the second network peer node, a second communication message in a second control plane format that is different than the first control plane format, wherein
the sending of the second communication message is performed as a result of obtaining said first information indicating that the second network node did not respond to the first communication message by transmitting a responsive communication message in said first control plane format, and
said second control plane format being one of: an RFC Control Plane Format and a Draft RFC Control Plane Format.

5. The method of claim 4, further comprising:
after sending the second communication message, obtaining second information with respect to the second communication message, the second information indicating one of: 1) that the second network peer responded to the second communication message by transmitting a responsive communication message in said second control plane format and 2) that the second network node did not respond to the second communication message by transmitting a responsive communication message in said second control plane format; and
determining, using said obtained second information, whether the second network peer node is: a) utilizing a first version of the PMIPv6 control plane or a second version of the PMIPv6 control plane or b) not utilizing either the first version or the second version of the PMIPv6 control plane, wherein the first version of the PMIPv6 control plane is a version corresponding to RFC 5844 and the second version of the PMIPv6 control plane is a version corresponding to a draft of RFC 5844.

6. The method of claim 5, wherein
the obtained second information indicates that the second network node did not respond to the first communication message by transmitting a responsive communication message in said second control plane format, and
as a result of said second information indicating that the second network node did not respond to the first communication message by transmitting a responsive communication message in said second control plane format, it is determined that the second network peer node is not utilizing either the first version or the second version of the PMIPv6 control plane.

7. The method of claim 5, wherein
said second control plane format is said Draft RFC Control Plane Format,
the obtained second information indicates that the second network peer responded to the second communication message by transmitting a responsive communication message in said second control plane format, and
as a result of said second information indicating that that the second network peer responded to the second communication message by transmitting a responsive communication message in said second control plane format, it is determined that the second network peer node is utilizing the second version of the PMIPv6 control plane.

8. The method of claim 1, wherein
the obtained second information indicates that the second network peer responded to the first communication message by transmitting a responsive communication message in said first control plane format,
as a result of said first information indicating that that the second network peer responded to the first communication message by transmitting a responsive communication message in said first control plane format, it is determined that the second network peer node is utilizing one of the first version of the PMIPv6 control plane and the second version of the PMIPv6 control plane.

9. The method of claim 1, further comprising:
sending, to the second network peer node, a second communication message in a second control plane format, said second control plane format being a control plane format according the RFC Control Plane Format, wherein
said first control plane format is a control plane format according to the Draft RFC Control Plane Format, and
the second communication message is sent prior to obtaining said first information.

10. The method of claim 9, wherein if only one communication response is received from the second network peer node, the determining further comprises determining the PIMPv6 control plane value to be the control plane format of the received communication response.

11. The method of claim 9, wherein if a plurality of communication responses are received from the second network peer node, the determining further comprises determining the PIMPv6 control plane value to be a default control plane format.

12. The method of claim 11, wherein the default control plane format is control plane A.

13. The method of claim 9, wherein if no responses from the second network peer node are received within a predetermined period of time, the communication response is an internal notification that indicates communication with the second network peer node is not possible, and the determining further comprises determining the PIMPv6 control plane is a null value.

14. The method of claim 4, wherein the first control plane format is control plane A and the second control plane format is control plane C.

15. A first network peer node for determining a Proxy Mobile Internet Protocol version 6 (PMIPv6) control plane used by a second network peer node, the first and second network peer nodes being in an Internet Protocol version 4 (IP4) transport network, the first network peer node comprising:
transmitting circuitry;
receiving circuitry; and
processing circuitry, the processing circuitry being configured to:
employ the transmitting circuitry to send, to the second network peer node, a first communication message in a first control plane format, said first control plane format being one of: a control plane format according to Request For Comment (RFC) 5844 (RFC Control Plane Format) and a control plane format according to a draft of RFC 5844 (Draft RFC Control Plane Format);
obtain information with respect to the first communication message, the information indicating one of: 1) that the second network peer responded to the first communication message by transmitting a responsive communication message in said first control plane format and 2) that the second network node did not respond to the first communication message by transmitting a responsive communication message in said first control plane format; and
determining, using said obtained first information, whether the second network peer node is: a) utilizing a first version of the PMIPv6 control plane or a second version of the PMIPv6 control plane or b) not utilizing either the first version or the second version of the PMIPv6 control plane, wherein the first version of the PMIPv6 control plane is a version corresponding to RFC 5844 and the second version of the PMIPv6 control plane is a version corresponding to a draft of RFC 5844.

16. The first network peer node of claim 15, wherein
the first network peer node is a Mobile Access Gateway (MAG) node,
the second network peer node is a Local Mobility Anchor (LMA) node, and
the first communication message is a Heartbeat message or a proxy binding update request.

17. The first network peer node of claim 15, wherein the first network peer node is a Local Mobility Anchor, LMA, node and the second network peer node is a Mobile Access Gateway, MAG, node and the first communication message is a Heartbeat message.

18. The first network peer node of claim 15, wherein
the obtained first information indicates that the second network node did not respond to the first communication message by transmitting a responsive communication message in said first control plane format, and
the processing circuitry is further configured to employ the transmitting circuitry to send, to the second network peer node, a second communication message in a second control plane format that is different than the first control plane format, wherein
the sending of the second communication message is performed as a result of said first information indicating that the second network node did not respond to the first communication message by transmitting a responsive communication message in said first control plane format, and said second control plane format being one of: an RFC Control Plane Format and a Draft RFC Control Plane Format.

19. The first network peer node of claim 18, wherein
the processing circuitry is configured such that, after sending the second communication message, the processing circuitry determines, using second information related to the second communication message, whether the second network peer node is: a) utilizing a first version of the PMIPv6 control plane or a second version of the PMIPv6 control plane or b) not utilizing either the first version or the second version of the PMIPv6 control plane, wherein the first version of the PMIPv6 control plane is a version corresponding to RFC 5844 and the second version of the PMIPv6 control plane is a version corresponding to a draft of RFC 5844, and
the second information indicates one of: 1) that the second network peer responded to the second communication message by transmitting a responsive communication message in said second control plane format and 2) that the second network node did not respond to the second communication message by transmitting a responsive communication message in said second control plane format.

20. The first network peer node of claim 19, wherein
the second information indicates that the second network node did not respond to the first communication message by transmitting a responsive communication message in said second control plane format, and
the processing circuitry is configured such that, as a result of said second information indicating that the second network node did not respond to the first communication message by transmitting a responsive communication message in said second control plane format, the processing circuitry determines that the second network peer node is not utilizing either the first version or the second version of the PMIPv6 control plane.

21. The first network peer node of claim 19, wherein
said second control plane format is said Draft RFC Control Plane Format,
the obtained second information indicates that the second network peer responded to the second communication message by transmitting a responsive communication message in said second control plane format, and
the processing circuitry is configured such that, as a result of said second information indicating that that the second network peer responded to the second communication message by transmitting a responsive communication message in said second control plane format, the processing circuitry determines that the second network peer node is utilizing the second version of the PMIPv6 control plane.

22. The first network peer node of claim 15, wherein
the obtained second information indicates that the second network peer responded to the first communication message by transmitting a responsive communication message in said first control plane format, and
the processing circuitry is configured such that, as a result of said first information indicating that that the second network peer responded to the first communication message by transmitting a responsive communication message in said first control plane format, the processing circuitry determines that the second network peer node is utilizing one of the first version of the PMIPv6 control plane and the second version of the PMIPv6 control plane.

23. The first network peer node of claim 15, wherein
the processing circuitry is further configured to employ the transmitting circuitry to send, to the second network peer node, a second communication message in a second control plane format, said second control plane format being a control plane format according the RFC Control Plane Format, wherein said first control plane format is a control plane format according to the Draft RFC Control Plane Format, and the processing circuitry is further configured to employ the transmitting circuitry to send the second communication message prior to the processing circuitry obtaining said first information.

24. The first network peer node of claim 23, wherein if only one communication response is received from the second network peer node, the processing circuitry is further configured to determine the PIMPv6 control plane value to be the control plane format of the received communication response.

25. The first network peer node of claim 23, wherein if a plurality of communication responses are received from the second network peer node, the processing circuitry is further configured to determine the PIMPv6 control plane value to be a default control plane format.

26. The first network peer node of claim 25, wherein the default control plane format is control plane A.

27. The first network peer node of claim 23, wherein if no responses from the second network peer node are received within a predetermined period of time, the communication response is an internal notification that indicates communication with the second network peer node is not possible, and the processing circuitry is further configured to determine the PIMPv6 control plane is a null value.

28. The first network peer node of claim 18, wherein the first control plane format is control plane A and the second control plane format is control plane C.

29. The first network peer node of claim 23, wherein the first control plane format is control plane A and the second control plane format is control plane C.

30. The method of claim 9, wherein the first control plane format is control plane A and the second control plane format is control plane C.

31. The method of claim 1, wherein the draft of RFC 5844 is draft-ietf-netlmm-pmip6-ipv4-support-NN, wherein NN is less than 18.

* * * * *

UNITED STATES PATENT AND TRADEMARK OFFICE
CERTIFICATE OF CORRECTION

PATENT NO. : 9,749,838 B2  
APPLICATION NO. : 13/508544  
DATED : August 29, 2017  
INVENTOR(S) : Qiang et al.

Page 1 of 2

It is certified that error appears in the above-identified patent and that said Letters Patent is hereby corrected as shown below:

On the Title Page

In Item (57), under "ABSTRACT", in Column 2, Line 3, delete "(PIMPv6)" and insert -- (PMIPv6) --, therefor.

In the Specification

In Column 4, Line 28, delete ""Service Parameters"" and insert -- Service Parameters --, therefor.

In Column 10, Line 15, delete "PIMPv6" and insert -- PMIPv6 --, therefor.

In Column 10, Line 17, delete "PIMPv6" and insert -- PMIPv6 --, therefor.

In Column 10, Line 27, delete "PIMPv6" and insert -- PMIPv6 --, therefor.

In Column 10, Line 30, delete "PIMPv6" and insert -- PMIPv6 --, therefor.

In Column 10, Line 35, delete "PIMPv6" and insert -- PMIPv6 --, therefor.

In Column 10, Line 38, delete "PIMPv6" and insert -- PMIPv6 --, therefor.

In Column 10, Line 57, delete "PIMPv6" and insert -- PMIPv6 --, therefor.

In Column 10, Line 61, delete "PIMPv6" and insert -- PMIPv6 --, therefor.

In the Claims

In Column 14, Line 43, in Claim 9, delete "according the" and insert -- according to the --, therefor.

In Column 14, Line 52, in Claim 10, delete "PIMPv6" and insert -- PMIPv6 --, therefor.

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,749,838 B2

In Column 14, Line 57, in Claim 11, delete "PIMPv6" and insert -- PMIPv6 --, therefor.

In Column 14, Line 66, in Claim 13, delete "PIMPv6" and insert -- PMIPv6 --, therefor.

In Column 15, Line 8, in Claim 15, delete "(IP4)" and insert -- (IPv4) --, therefor.

In Column 17, Line 6, in Claim 23, delete "according the" and insert -- according to the --, therefor.

In Column 17, Line 16, in Claim 24, delete "PIMPv6" and insert -- PMIPv6 --, therefor.

In Column 17, Line 22, in Claim 25, delete "PIMPv6" and insert -- PMIPv6 --, therefor.

In Column 18, Line 9, in Claim 27, delete "PIMPv6" and insert -- PMIPv6 --, therefor.